June 10, 1930.  H. P. TOWNSEND  1,763,635

SCREW THREADING MACHINE

Filed July 29, 1926  2 Sheets-Sheet 1

INVENTOR
Harry P. Townsend.
by
Arthur B. Jenkins,
ATTORNEY

June 10, 1930.  H. P. TOWNSEND  1,763,635
SCREW THREADING MACHINE
Filed July 29, 1926   2 Sheets-Sheet 2
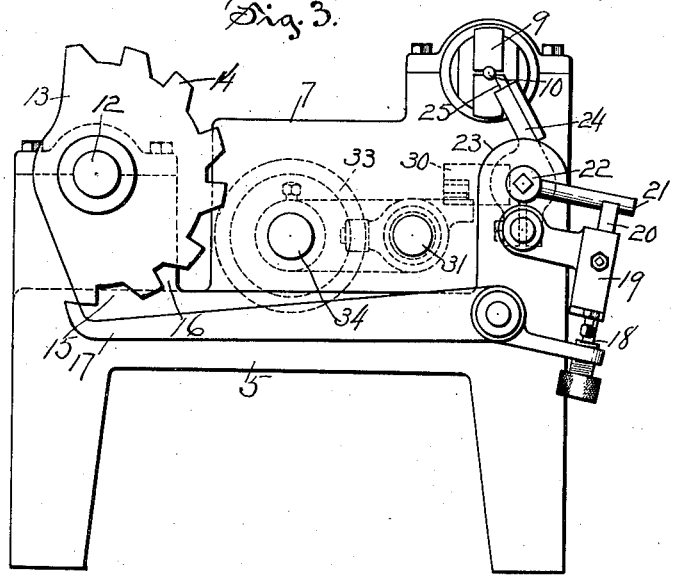
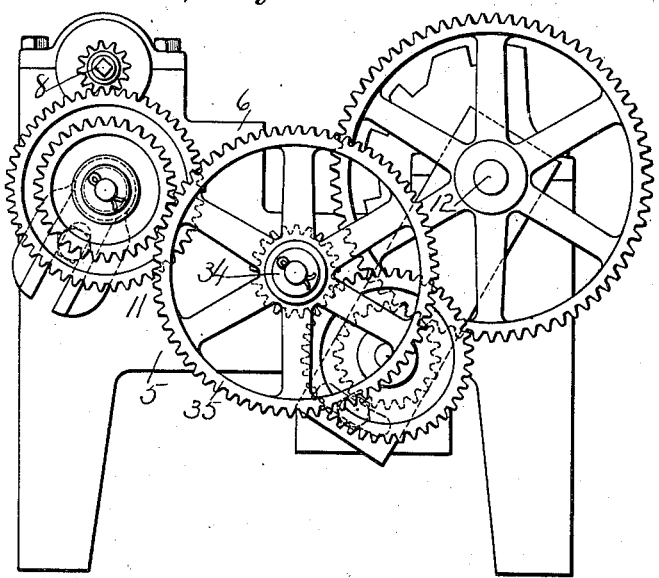
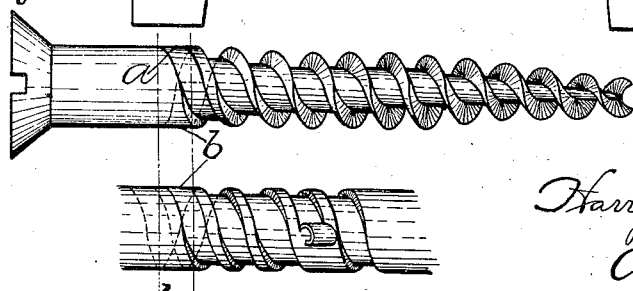
INVENTOR
Harry P. Townsend.
by
Arthur C. Jenkins
ATTORNEY Patented June 10, 1930

1,763,635

UNITED STATES PATENT OFFICE

HARRY P. TOWNSEND, OF HARTFORD, CONNECTICUT

SCREW-THREADING MACHINE

Application filed July 29, 1926. Serial No. 125,779.

My invention relates more especially to machines employed for cutting a plurality of threads upon screws and it is especially applicable for cutting threads upon so called "wood screws", and an object of my invention, among others, is the production of a machine of this class that shall be simple in construction and operation, and particularly efficient as to the results produced by it.

One form of machine embodying my invention and in the construction and use of which the objects herein set out, as well as others, may be attained, is illustrated in the accompanying drawings, in which—

Figure 3 is a view in elevation of one end of the machine, and

Figure 4 is a view in elevation of the opposite end of the machine.

Figure 5 is a view of a screw and of a portion of a screw produced by my improved machine and illustrating the operation of cutting a double thread.

Figure 1:
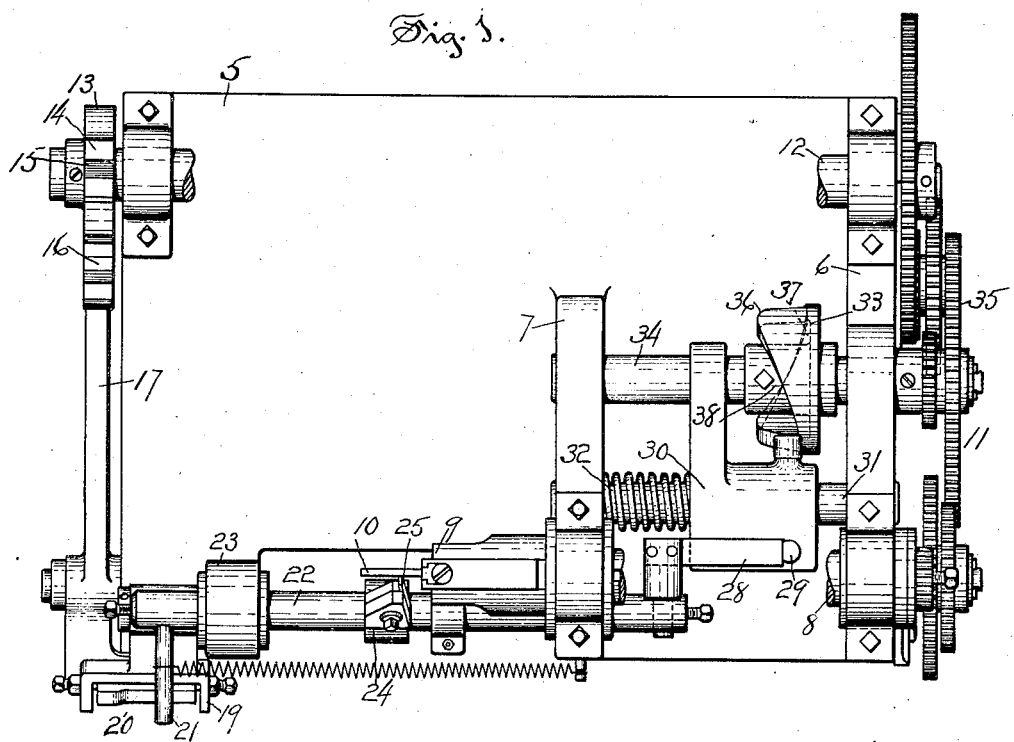
Figure 1 is a plan view of a portion of my improved machine with parts broken away to show construction.
Figure 2:
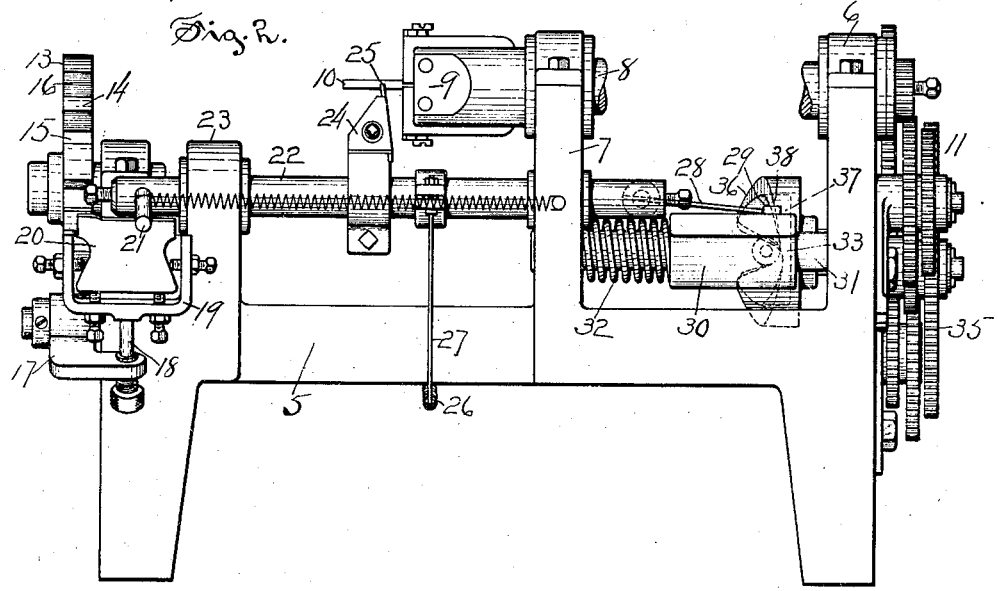
Figure 2 is a view in front elevation with parts broken away to show construction.

In the accompanying drawings the numeral 5 denotes the base of my improved machine that may be supported in any suitable manner, as upon legs, as shown, supports 6—7 being spaced apart and rising from the base, as shown in Figures 1 and 2 of the drawings. A spindle 8 is rotatably mounted in the supports and is provided with any suitable means, as a pulley (not shown) by means of which it may be driven as by a belt from any suitable source of power. A chuck 9 is attached to one end of the spindle for the purpose of receiving and holding blanks 10, and a train of gears, denoted generally by the numeral 11, is supported on the end of the machine and connects the spindle 8 with a cam shaft 12, shown as broken away at its center, said broken away part receiving cams for operating certain parts of the machine, as feeding and other mechanisms, which, not being necessary to an understanding of the present invention, are not shown herein.

This cam shaft is supported by bearings on the base 5 and has a tool operating cam 13 secured thereto, this cam having lobes 14 with spaces 15—16 therebetween, the spaces 15 being of widths different from those of the spaces 16 and for a purpose to be hereinafter described. A tool operating lever 17 is pivotally mounted on the end of the machine, one end of said lever being adapted to be engaged by the lobes 14 of the cam 13 and the other end of said lever having a screw stud 18 adapted to be pressed into contact with a forming shoe frame 19 pivotally supported on the end of the machine and having a forming shoe 20 positioned to support a stud 21 projecting from a tool supporting bar 22 pivotally mounted in bearings in the support 7 and in a tool bar support 23 rising from the base 5. A tool post 24 is secured to the bar 22 and supports a cutting tool 25 in proper position for operation upon the blank 10; the upper edge of the shoe 20 being formed to properly guide the tool for cutting operations on said blank and especially for forming the point upon said screw. The mechanism just described forces the cutting tool into contact with the blank thereby imparting movement to cutting position thereto and a spring 26 secured to a rod 27 and to the base 5 may be employed to rock the tool away from the blank.

The tool supporting bar 22 has a traversing finger 28 projecting therefrom into contact with a traversing stud 29 projecting from a tool traversing guide 30 mounted upon a slide supporting bar 31 and forced in one direction by a spring 32 and in a reverse direction by a projection engaged with a tool traversing cam 33 mounted on a shaft 34 driven as by means of a traversing gear 35 comprising one of the train of gears 11 hereinbefore referred to.

This cam 33 has two lobes 36 for moving the tool 25 away from the chuck 9 lengthwise of and toward the pointed end of the blank. These lobes are located nearly diametrically opposite each other as shown in Figure 1 and the depths of the spaces between the lobes 36 measured between the highest points of the lobes are different, that is the space 37 between the lobes on one side of the cam 33 is deeper than the space 38 on the diametrically opposite side of said cam as shown in said figure, thereby permitting the cutting tool to travel backwardly, that is toward the chuck, further in one case than in the other, the deeper space 37 permitting the tool to travel further back than the shallower space 38.

As hereinbefore mentioned the spaces 15—16 on the cam 13 are of different widths, it being now noted that the spaces 15 are the widest. When the end of the lever 17 is in the spaces the cutting tool is out of contact with the blank, and, therefore, when the end of said lever is in the spaces 15 the tool will be held away from said blank and out of contact therewith for a longer period than when the end of said lever is in the spaces 16. The gears comprising the train 11 are so timed that a certain number of full rotations of the blank will take place to each pass of the tool, that is, a movement forward and back from the chuck to the pointed end of the blank. It will now be apparent that the tool will be engaged with the blank by the action of the lobes 14 of the cams 13, and that it will be moved lengthwise of the blank by the action of the lobes 36 of the cam 33.

The train of gears are timed so that the blank being cut will have a certain number of complete rotations to each pass of the cutting tool, as above pointed out, said pass being effected by the cam 33, and the gears are further so timed that a single lobe 14 and a space 15 next thereto will effect a movement of the tool into contact with the blank or into cutting position at the beginning of the forward movement of the tool to cut, and a movement of the tool away from the blank at the beginning of backward movement of the tool, such forward and backward movements constituting a single pass of the tool. Therefore, if the spaces between the lobes 14 were alike in width, and were the spaces between the lobes 36 of the cam 33 of equal depth the tool would begin its cut at each pass at the same point on the blank and a single thread would be cut thereon. However, by making these spaces of different widths and of different depths the following operation takes place:

Let it be assumed that the first forward movement of the cutting tool begins at the dotted line c, this position of the tool having been determined by the shallow space 38 on the cam 33 and that the tool at the beginning of the cutting operation begins its cut at the point a on said line (see Figure 5) and that the tool is moved forward in its first pass by the action of the lobe 36 on the cam 33 just in advance (determined by the direction of movement of the cam) of the deeper space 37 and that the tool is engaged with the blank at the point a by the action of a lobe 14 on the cam 13 just in advance of one of the wide spaces 15 on said cam. The blank being rotated by the spindle 8 a groove will be partially cut on the blank extending from the point a to the pointed end of the blank at the end of which operation the lever 17 will enter a wide groove 15 of the cam 13 just mentioned and the projection from the slide 30 will enter a deep space 37 of the cam 33. As a consequence, the tool will be moved back further than in the preceding pass (by reason of the deep space 37) and to a point denoted by the dotted line d and in a line passing longitudinally of the blank through the point a. By reason of the location of the lever 17 in one of the wide spaces 15, however, the tool will not at once be engaged with the blank, but the latter will be permitted to have an idle part rotation, at the end of which the tool will be rocked by a lobe 14 into engagement with the blank at the point b diametrically opposite the point a and at a plane passing lengthwise through the dotted line c—from which point a groove will be partially cut to the end of the blank and the tool will be passed back to take a second cut in the first groove, beginning at the point a, and so on until the operation of cutting the threads is completed.

It will be noted that a material feature of my invention resides in the means for preventing the cutting tool from beginning its cut on at least one of the grooves until the blank has been permitted an idle, part rotation, and any means for governing the time of beginning of forward movement of the tool at the completion of such extra half rotation may be employed, such means not necessarily embodying the space 37 in the cam 36. In other words, the tool has a traversing movement that comprises a forward movement for effecting cutting action and a backward movement to position the tool for the next cutting action, the latter movement being substantially the time from the end of one of the cuts of a groove to the beginning of the next cut in the next groove. Some of the positioning movements are longer in point of time than other such movements, in the machine as shown herein, adapted to cut two threads, every other positioning movement being longer in point of time than the next preceding positioning movement. The wide and narrow spaces in the cam 13 are for the purpose of governing the time of engagement of the tool with the blank to correspond to those differences in the time of the positioning movements of the tool, the period between disengagement of the tool from the blank and its reengagement therewith being longer in some cases than in others, in the machine herein shown every other such period being longer than the next preceding one.

It is further observed that more than two threads may be cut by a machine embodying my invention by simply varying the number of wide and deep spaces to accord with the number of threads desired and in a manner that will be readily understood from a disclosure of the invention as made herein.

In accordance with the provisions of the patent statutes I have described the principles of operation of my invention, together with the device which I now consider to represent the best embodiment thereof; but I desire to have it understood that the device shown is only illustrative and that the invention may be carried out by other means and applied to uses other than those above set out.

I claim—

1. A screw thread cutting machine including a rotatable spindle having means for holding a blank, a thread cutting tool, means for imparting movement into cutting position and traversing movement to the tool, the latter comprising a cam having lobes of different depths for imparting to the tool different lengths of paths of travel in its traversing movement, and means for engaging the tool with the blank at the end of each traversing movement thereof.

2. A screw thread cutting machine including a rotatable spindle having means for holding a blank, a thread cutting tool, means for imparting movement into cutting position and traversing movements to said tool, the latter comprising a cam having lobes with spaces therebetween of different depths for imparting to the tool different lengths of paths of travel thereof in its alternate traversing movements, and means for engaging the tool with the blank after the completion of each traversing movement thereof.

3. A screw thread cutting machine including a rotatable spindle having means for holding a blank, a thread cutting tool, means for engaging the tool with and for disengaging it from the blank, and a traversing cam fixed upon a shaft and having lobes of different depths defining alternate deep and shallow recesses to impart to the tool different lengths of paths of travel thereof.

4. A screw thread cutting machine including a rotatable spindle having means for holding a blank, a thread cutting tool, means for engaging the tool with and for disengaging it from the blank, and a traversing cam fixed upon a shaft to impart traversing movement to the tool and having its operative face shaped to move the tool farther in alternate reciprocating movements.

5. A screw thread cutting machine including a rotatable spindle having means for holding a blank, a thread cutting tool, a cam for engaging the tool with and for disengaging it from the blank, said cam being shaped to effect longer disengaging movements of the tool from the blank at alternate disengaging movements thereof, and a traversing cam mounted to impart traversing movement to the tool, said cam having lobes with spaces therebetween of different depths to effect such traversing movement in paths of different lengths.

HARRY P. TOWNSEND.